May 7, 1957 R. E. SCHELL 2,791,696
CALIBRATION METHOD AND DEVICE THEREFOR
Filed Feb. 23, 1952
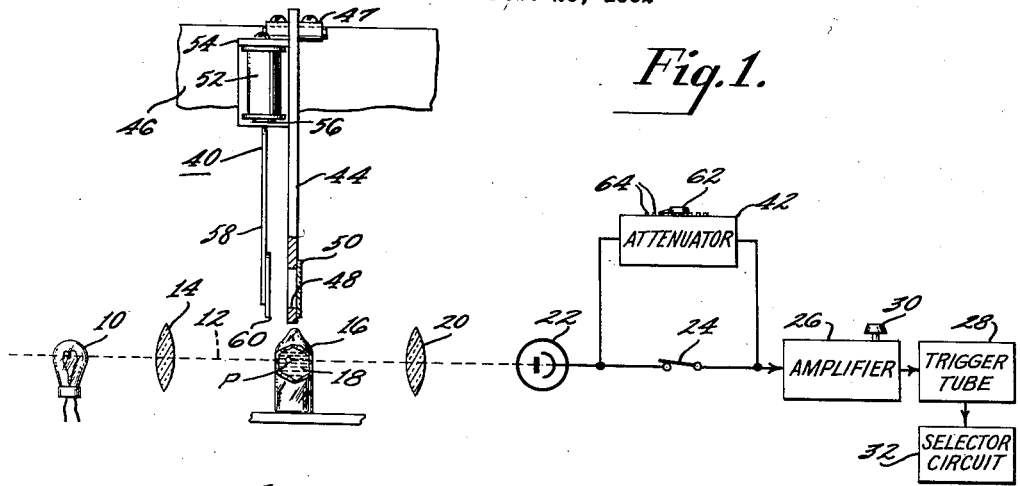
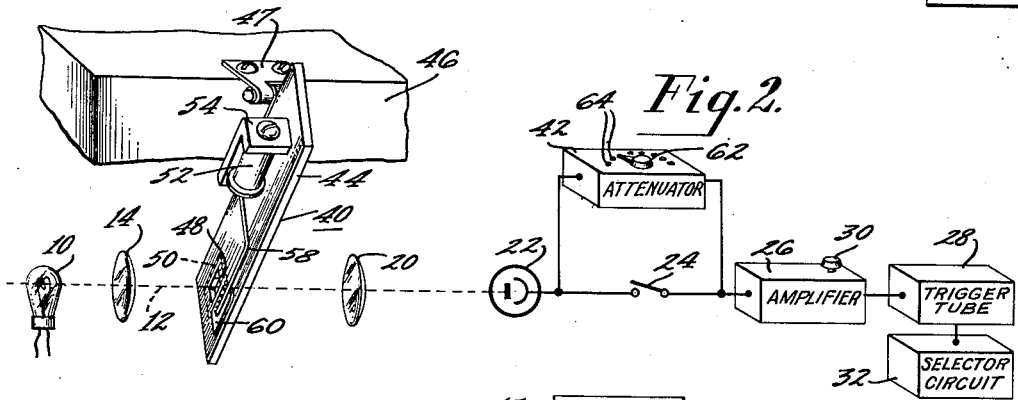
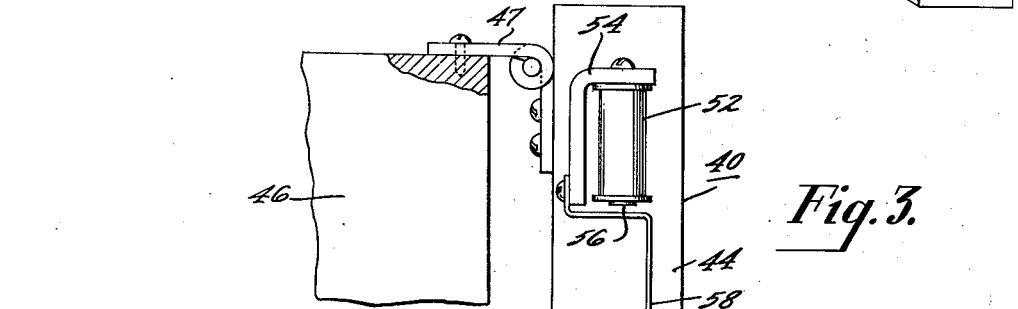
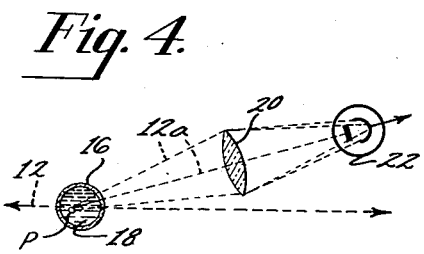
INVENTOR
Roger E. Schell
BY
Morris Kalkin
ATTORNEY

United States Patent Office 2,791,696
Patented May 7, 1957

2,791,696

CALIBRATION METHOD AND DEVICE THEREFOR

Roger E. Schell, Woodbury, N. J., assignor to Radio Corporation of America, a corporation of Delaware Application February 23, 1952, Serial No. 273,075

7 Claims. (Cl. 250—214)

This invention relates to calibration methods and devices, and more particularly to methods of and means for calibrating inspection equipment for detecting foreign bodies in liquid-filled, translucent containers by photo-electric means. While not specifically limted thereto, the calibration methods and devices of this invention are particularly applicable to the process and apparatus for inspecting fluids disclosed in United States Patent No. 2,132,447, issued to George Philip Stout on October 11, 1938.

It has been proposed to inspect the fluid contents of a translucent container for foreign particles by utilizing electrical impulses, derived from photo-electric means, as a result of abrupt changes in current caused by modulating a steady beam of radiant energy with the foreign particles. Since a process and apparatus for inspecting fluids in this manner is adequately described in United States Patent No. 2,132,447, issued to George Philip Stout, only a brief description of the process and apparatus having a bearing on the calibration methods and apparatus of the present invention will be given.

In accordance with the Stout patent, a beam of light, as from an incandescent lamp, is partly converged through a lens system and directed through a translucent container holding the fluid to be inspected. Prior to the inspection, the container has been rotated to cause any foreign particles therein to revolve with the fluid. The rotation of the container is then stopped suddenly just before the inspection commences. Any foreign particles in the fluid will continue to revolve during the inspection period, and therefore, modulate the light beam passing through the container. The modulated light is directed upon photo-electric means, by a second lens system, and electrical impulses or signals are derived which are proportional to the degree of modulation of the light beam. The electrical impulses are then amplified by an amplifier and fed to a triggering circuit which, in turn, actuates a selector circuit. Since the degree of modulation of the light beam is proportional to the size of the oscillating foreign particles in the fluid, the apparatus may be adjusted with respect to the minimum size of a particle to be detected by adjusting the degree of amplification of the electrical impulses fed to the triggering circuit. Irregularities in the shape of the container, imperfections in the container material, or contamination on the outside surface of the container will not produce any modulation of the light beam because the container is stationary during the inspection period.

Apparatus for an inspection system in accordance with the principles of the Stout patent requires frequent calibration because of the numerous components which are unavoidably subject to variation. For instance, some of the major components of the inspection system which may vary with use are the light source or lamp, the lens system because of the accumulation of dust, the photo-electric tubes, and the amplifier with its multiplicity of parts. To perform a uniform inspection continuously, it is necessary to compensate for these variations periodically so as to restore the operation of the apparatus to standard conditions.

In order to be effective, any form of a calibrating system must involve all of the components which contribute to the process of inspection. The calibration device must not introduce any uncertainty as to its own operation, else a confusion will exist whether a detected change is caused by the apparatus being calibrated or is caused by the calibrating device itself.

Where it is possible to obtain a container of fluid which is borderline (just barely rejectable by the inspection apparatus), the inspection apparatus may be calibrated with this sample. In certain cases, however, as, for example, in the inspection of liquid pharmaceuticals contained in glass ampules and intended for injection into the human body, it is a practical impossibility to prepare an ampule containing a particle of borderline dimensions because of the microscopic size of such a particle and the extreme difficulty in excluding other particles. Also, samples prepared for calibration purposes deteriorate with age and are, therefore, unsuitable for constant use as a fixed standard.

It is, therefore, a general object of this invention to provide improved methods of and means for calibrating photo-electric inspection equipment of the type described to insure standard operating conditions.

It is another object of this invention to provide an improved calibration device by means of which the constancy of the performance of certain inspection equipment may be checked, and to provide a guide for applying some form of compensation to restore the operation of the equipment to standard conditions, when necessary.

It is a further object of this invention to provide improved methods of and means for adjusting photo-electric inspection equipment, of the type described, to a predetermined criticalness of inspection regardless of the number of variable components in the equipment.

Still another object of this invention is to provide improved calibration methods and means of the above-described character by means of which a plurality of certain, similar inspection machines may be calibrated completely independently of each other to any degree of criticalness without the use of standardized samples.

A still further object of this invention is to provide improved calibration methods and means of the above-described character for calibrating a photo-electric, ampule inspection machine so that the latter will reject ampules containing fluid having foreign particles a size greater than that permissible.

In accordance with the present invention, the foregoing and other related objects and advantages are attained by an improved calibration method and apparatus therefor wherein a revolving particle of foreign material of undesired size in a liquid-filled ampule initiates a sequence of events leading to the rejection of the ampule. For calibration purposes, means are provided to mechanically modulate the light beam 100 percent. The amount of light falling upon the photo-electric means is controlled by a diffusion disc placed in the same position that would normally be occupied by an ampule undergoing inspection in such a manner that the intensity of the light is of substantially the same magnitude as when an ampule is being inspected. Since the electrical impulses or signals derived from the photo-electric means during calibration, as a result of 100 percent modulation of the light beam, are very much larger than the signals produced by the modulation of the light beam by a "borderline" particle during normal inspection, an attenuator is inserted in the circuit between the photo-electric means and the input to the amplifier. The degree of attenuation in this attenuator is exactly equal to the ratio of the light modulation produced by the mechanical modulating means and the modulation produced by a "borderline" particle in an ampule. By making the attenuation of this attenuator variable by known amounts, the "borderline condition," that is, the criticalness of inspection is also made variable by known and reproduceable amounts. With the attenuator set to a desired degree of attenuation, the gain of the amplifier is adjusted until the signal just triggers the trigger tube which, in turn, actuates the selector circuit. Thus, an operator of the inspection machine is enabled to preset the machine to any desired criticalness of inspection regardless of the variables in the inspection system.

A more complete understanding of the invention can be had by reference to the following description of an illustrative embodiment thereof, when considered in connection with the accompanying drawing in which Fig. 1 is a schematic diagram of the components of a photo-electric inspection system, in side elevational view, showing an ampule undergoing inspection and the calibration apparatus inoperative, Fig. 2 is a schematic diagram of the components of the photo-electric inspection system in perspective view showing the calibration apparatus in position for calibrating the inspection system in accordance with the present invention, Fig. 3 is a front elevational view of a mechanical, light modulating calibration device used in the calibration method in accordance with the present invention, and Fig. 4 is a schematic diagram of a portion of a photo-electric inspection system, in top plan view, showing a modification of a portion of the inspection system in Figs. 1 and 2.

Referring to Fig. 1, there is shown schematically a photo-electric inspection system in which a radiant energy source or incandescent exciter lamp 10 projects a light beam, represented by the dashed line 12, through a converging lens system 14, shown schematically as a simple lens, and through an ampule 16 undergoing inspection. Just prior to the inspection, the ampule 16 has been rotated to cause any foreign particles to revolve with the liquid 18 therein. The rotation of the ampule 16 is stopped suddenly just before the actual inspection commences so that if any foreign particles are present they will still be rotating during the inspection period and modulate the light beam 12 through the ampule 16. The light beam 12 leaving the ampule 16 passes through another converging lens system 20, represented schematically as a simple lens, and falls upon a light-sensitive means or photo-electric cell 22. The photo-electric cell 22 may represent a plurality of phototubes as is actually the case in inspection machines of this type.

During the inspection period of the ampule 16, a switch 24 connects the photo-electric cell 22 directly to an amplifier 26. If there is a foreign particle in the ampule 16, it will modulate the light beam 12 and cause the photo-electric cell to produce an electrical impulse or signal which will be amplified by the ampifier 26 and applied to a trigger tube 28. Since the electrical impulse or signal derived from the photo-electric cell 22 is proportional to the degree or percentage of modulation of the light beam 12, and the degree or percentage of modulation is proportional to the size of the foreign particle in the fluid 18 of the ampule 16, the amplifier 26 may be adjusted, as by a gain control knob 30, so that an amplified signal just sufficient to trigger the trigger tube 28 represents a foreign particle of a predetermined size. The trigger tube 28 is connected to a selector circuit 32 which may cause any type of desired indication, warning, or rejection system to operate.

Referring to Fig. 4, there is shown a modification of a portion of the inspection system illustrated in Figs. 1 and 2 to which the calibration methods and means of the present invention are applicable also. The light beam 12 passes through the ampule 16 without affecting the photo-electric cell 22 when there are no foreign particles in the liquid 18. A moving foreign particle P, however, in the liquid 18 of the stationary ampule 16, will deflect the light beam 12 as shown by the dashed lines 12a. The deflected light beam 12a is directed to the photo-electric cell 22 by the lens system 20. The photo-electric cell 22, when used in this manner, may also be of the multiplier type.

Since it is extremely difficult to prepare sample ampules for calibration purposes containing fluid having a borderline foreign particle therein, a photo-electric inspection machine of the type described may be calibrated to reject an ampule having an undesirable particle which will modulate the light beam at least a predetermined amount representative of the size of a borderline particle.

For a better understanding of the calibration method and means, reference is had to Fig. 2, in which there is shown a photo-electric inspection system similar to Fig. 1 and wherein a calibration device 40 has been swung into position for calibrating the system. An attenuator 42 is electrically connected across the switch 24, and the switch 24 is opened. By the term attenuator, as used herein and in the appended claims, is meant a device in the nature of a variable resistance or a potentiometer for the purpose of reducing the magnitude of a signal to a desired fraction thereof.

The calibration device 40 comprises an elongated mounting frame 44 pivotally mounted near its upper end to a fixed member 46 of the inspection machine by means of a hinge 47. The calibration device 40 is adapted to be swung either into the position normally occupied by the ampule 16 undergoing inspection, or swung upwardly and out of the way when not required for calibration purposes.

The frame 44 is formed with a small, rectangular, through opening 48 near its lower end. The opening 48 is covered with a disc 50 of light-diffusing material and fixed to the frame 40 in any suitable manner. During the calibration operation, the frame 40 is positioned transversely to the light beam 12, as shown in Fig. 2, so that the opening 48 therein is aligned with the lens systems 14, 20 and centered on the light beam 12.

Means are provided to modulate completely the light beam 12 passing through the opening 48 and falling on the photo-electric cell 22. To this end, there is provided a coil 52 mounted near the upper end of the frame 40. The coil 52 may be energized by alternating current or pulsating direct current. An iron bracket 54 and a soft iron core 56 provide a magnetic flux path which is completed by a reed 58 attached to the bracket 54. A vane 60 is fixed to the lower end of the reed 58 adjacent an edge of the opening 48 in the frame 40. When the coil 52 is energized, the alternating magnetic flux produced thereby acts upon the reed 58 and causes it to vibrate. The vane 60, in turn, alternately completely covers the opening 48 and completely uncovers it. In this manner, the light beam 12 reaching the photo-electric cell 22 is modulated 100 percent. A modulation frequency of about 15 cps. has been found satisfactory for calibrating an inspection system, of the type described, for ampules.

The disc 50 of light-diffusing material is chosen to produce substantially the same degree of illumination on the photo-electric cell 22 during the calibration process as during the inspection process. By this procedure, the photo-electric cell is operated on substantially the same straight-line portion of its characteristic curve as used during the inspection process. By standardizing to close limits the dimensions of the opening 48 and the disc 50, the ratio between the light modulation produced by the calibration device 40 to the light modulation produced by a given particle in an ampule undergoing inspection can be determined and reproduced accurately. In a modification of the inspection system such as shown in Fig. 4, the diffusion disc 50 also functions to direct a portion of the light beam 12 onto the photo-electric cell 22 during the calibration process.

The attenuator 42 is an accurately calibrated device for attenuating the signals deriver from the photo-electric cell 22 by known and reproduceable amounts. A desired degree or percentage of attenuation of the signal derived from the photo-electric cell 22, as a result of the 100 percent modulation of the light beam 12, may be chosen by turning a control knob 62 to one of a plurality of contacts 64 of the attenuator 42. Since a revolving foreign particle of a given size in the fluid 18 of the ampule 16 will modulate the light beam 12 a definite fraction of 100 percent, the range of degrees of attenuation of the attenuator 42 is representative of the range of percentages of modulation produced by a definite range of sizes of revolving foreign particles. Thus, for example, to calibrate the inspection machine to reject an ampule containing fluid having a foreign particle of the size that will modulate the light beam 12 at least 0.05 percent, the attenuator 42 is adjusted, by turning the control knob 62 to a proper contact 64, to attenuate a signal from the 100 percent modulated light beam by a factor $$\frac{100}{.05}$$

or 2,000 times. The switch 24 is opened and the light beam is modulated 100 percent by the calibration device 40. The amplifier 26 is then adjusted by the gain control knob 30 to amplify the attenuated signal to a value which will just trigger the trigger tube 28. The trigger tube 28 will, in turn, actuate the selector circuit 32 which is adapted to function as a rejection means. When the calibration device 40 is swung out of the way, as shown in Fig. 1, and the switch 24 is closed, the inspection machine is ready for the inspection process.

The simplicity of a system of standards by means of which the amount of attenuation of a light beam, caused by a foreign particle in a fluid, can be specified accounts for the ability to provide a calibration system which is defined in physical terms and, therefore, independently reproduceable in a plurality of similar machines.

The principles described above may be more specifically expressed by means of a few general equations. For inspection, the following equation represents the over-all system performance:

$$L \times F_1 \times Mp \times F_2 \times S \times G = E \qquad (1)$$

where:

$L$ = a factor representing the light output from the exciter lamp 10,
$F_1$ = a factor representing the optical properties of the lens 14,
$Mp$ = a factor expressing the light modulation of a "borderline" particle in an ampule,
$F_2$ = a factor representing the optical properties of the lens 20,
$S$ = a factor representing the sensitivity of the phototube 22,
$G$ = the gain of the amplifier 26, and
$E$ = the minimum signal voltage required to operate the trigger tube 28.

For calibration, the following equation applies:

$$L \times F_1 \times Mc \times F_2 \times S \times 1/A \times G = E \qquad (2)$$

where:

$Mc$ = a factor expressing the light modulation of the calibration device 40, and
$A$ = the attenuation of the attenuator 42.

Equating Equations 1 and 2 and cancelling, the following is obtained:

$$Mp = \frac{Mc}{A} \qquad (3)$$

$$A = \frac{Mc}{Mp} \qquad (4)$$

This characteristic of the attenuator was expressed in general terms earlier in the description of the apparatus. Since $Mc$ is intentionally made a constant (100 percent)

$$A = \frac{K}{Mp} \qquad (5)$$

From Equation 5 can be seen the simple relationship between the value of $A$ and that of $Mp$, which is, in effect, an expression of the criticalness of inspection, since the modulation produced by a foreign particle is a function of its size.

The practical operation of these equations is as follows: A certain criticalness of inspection being desired, the value of $A$ is set at its corresponding value (Equation 5). The calibration device 40 is lowered into position and the switch 24 is opened (these operations may be conveniently mechanically inter-connected). Either $L$ or $G$, or both $L$ and $G$, in Equation 2 can then be adjusted until the equation is balanced. It is preferable to obtain this balance by adjusting the gain of the amplifier, as it is so easily accomplished. When Equation 2 is balanced, the calibration device 40 is lifted out of the way, the switch 24 is closed, and inspection may proceed. From Equation 1, it can be seen that a borderline particle in an ampule will now just balance the equation, which is the desired objective. Particles smaller or larger than the borderline size (which will produce $Mp$) will naturally cause a signal on the trigger tube either smaller or larger, respectively, than $E$. Therefore, they will, accordingly, be accepted or rejected, respectively.

It will be noted that the factors concerned with the gradual darkening of the exciter lamp 10, the changes in the optical systems 14, 20 by accumulation of dust, the changes in phototube 22 sensitivity, or any other factor, appear in both Equations 1 and 2. Therefore, their effect is cancelled out by this calibration system.

There has thus been described a system of calibration for a photo-electric inspection device that is simple to operate, considers all the factors involved in the inspection process, and is based on physical quantities, thereby making it independently reproduceable on a plurality of similar machines. Predetermined values of criticalness of inspection may be pre-set independently of variables in the system.

While a vibrating reed type of light modulator is described herein, that particular form is not essential to the operation of the system and any other form of mechanical light modulation, such as a motor-driven sector wheel, for example, falls within the scope of this invention.

What is claimed is:

1. A method of calibrating, with the aid of an attenuator, a photo-electric inspection system of the type used for detecting in a fluid the presence of a foreign particle having a size greater than a predetermined size by circulating the fluid in a manner to cause oscillation of said particle therein, modulating a light beam less than 100 percent with said oscillating particle, deriving an electrical impulse photo-electrically from said modulated light beam, amplifying said impulse, and triggering a selector circuit with said amplified impulse to cause rejection of said fluid with said foreign particle therein; said method of calibration comprising adjusting said attenuator to a value representative of a predetermined desired criticalness of inspection, modulating said light beam 100 percent, diffusing said 100 percent modulated light beam to an intensity corresponding to the intensity of the light beam after passing through the fluid during the inspection process, deriving photo-electrically an electrical signal from said 100 percent modulated diffused light beam, modulating said electrical signal to produce electrical impulses feeding said last-mentioned impulses to said adjusted attenuator, and amplifying said attenuated impulses to a magnitude just sufficient to trigger said selector circuit.

2. A method of calibrating, with the aid of an attenuator, a photo-electric inspection system of the type used for detecting in a fluid the presence of a foreign particle having a size greater than a predetermined size, by circulating the fluid in a manner to cause oscillation of said particle therein, modulating a light beam less than 100 percent with said oscillating particle, deriving an electrical impulse photo-electrically from said modulated light beam, amplifying said impulse, and triggering a selector circuit with said amplified impulse to cause rejection of said fluid with said foreign particle therein; said method of calibration comprising adjusting said attenuator to a value representative of a predetermined desired criticalness of inspection, modulating said light beam 100 percent, diffusing said 100 percent modulated light beam to an intensity corresponding to the intensity of the light beam after passing through the fluid during the inspection process, deriving photo-electrically an electrical impulse from said 100 percent modulated diffused light beam, feeding said last-mentioned impulse to said adjusted attenuator, amplifying said last-mentioned impulse to a value below that necessary to trigger said selector circuit, and adjusting the intensity of said light beam at its source until the selector circuit is just triggered.

3. A method of calibrating, with the aid of an attenuator, a photo-electric inspection system of the type used for detecting in a fluid the presence of a foreign particle being of a predetermined borderline size or greater, by circulating the fluid in a manner to cause oscillation of said particle therein, modulating a light beam with said oscillating particle, deriving an electrical impulse from said modulated light beam, amplifying said impulse, and triggering a selector circuit with said amplified impulse to cause rejection of said fluid containing said foreign particle therein; said method of calibration comprising adjusting said attenuator to attenuate an electrical impulse by a factor determined by a fraction in which the numerator is 100 and the denominator is the percentage of modulation of said light beam by said oscillating particle of borderline size, modulating mechanically said light beam 100 percent, diffusing said 100 percent modulated light beam to an intensity corresponding to the intensity of the light beam after passing through the fluid during the inspection process, deriving an electrical impulse from said 100 percent modulated diffused light beam, feeding said last-mentioned impulse to said adjusted attenuator, and amplifying said last-mentioned impulse to a magnitude just sufficient to trigger said selector circuit to cause rejection of said fluid.

4. A method of calibrating, with the aid of an attenuator, a photo-electric inspection system of the type used for detecting the presence of a foreign particle in a fluid, said foreign particle being of a predetermined borderline size or greater, by circulating the fluid in a manner to cause oscillation of said particle therein, modulating a light beam with said oscillating particle, deriving an electrical impulse from said modulated light beam, amplifying said impulse, and triggering a selector circuit with said amplified impulse to cause rejection of said fluid containing said foreign particle therein; said method of calibration comprising adjusting said attenuator to attenuate said electrical impulse by a factor determined by a fraction in which the numerator is 100 and the denominator is the percentage of modulation of said light beam by said oscillating particle of borderline size, modulating mechanically said light beam 100 percent, diffusing said 100 percent modulated light beam to an intensity corresponding to the intensity of the light beam after passing through the fluid during the inspection process, deriving an electrical impulse from said 100 percent modulated diffused light beam, feeding said last-mentioned impulse to said adjusted attenuator, amplifying said last-mentioned impulse to a value below that necessary to trigger said selector circuit, and adjusting the intensity of said light beam until the selector circuit is just triggered.

5. In an inspection system of the type used for detecting the presence of a moving foreign particle of borderline size or greater in the fluid of a translucent container and comprising (1) a source of a radiant energy beam, (2) a first beam directive means, (3) a second beam directive means behind said first beam directive means, (4) means responsive to the radiant energy through said second beam directive means for deriving an electrical signal therefrom, (5) means for amplifying said signal, (6) a selector circuit, and (7) means responsive to the amplified signal for actuating said selector circuit when said moving particle modulates said beam; the combination therewith of a means for modulating said signal for providing a calibrating impulse, an attenuating means variable by known amounts disposed between said electrical signal deriving means and said amplifying means to reduce the magnitude of said calibrating impulse to a preselected fraction thereof, means for adjusting the gain of said amplifying means to cause said selector circuit to be actuated in response to said preselected fraction of said calibrating impulse, said modulating means including means to modulate said beam 100 percent, and means to diffuse and reduce the intensity of said modulated beam to substantially the intensity of said beam during the inspection process.

6. In an inspection system of the type used for detecting the presence of a moving foreign particle of borderline size or greater in the fluid of a translucent container and comprising (1) a source of a radiant energy beam, (2) a first beam directive means, (3) a second beam directive means behind said first beam directive means, (4) means responsive to the radiant energy through said second beam directive means for deriving an electrical signal therefrom, (5) means for amplifying said signal, (6) a selector circuit, and (7) means responsive to the amplified signal for actuating said selector circuit when said moving particle modulates said beam; the combination therewith of a means for modulating said beam disposed in the path of said beam for providing a calibrating impulse, an attenuating means variable by known amounts disposed between said electrical signal deriving means and said amplifying means to reduce the magnitude of said calibrating impulse to a preselected fraction thereof, means for adjusting the gain of said amplifying means to cause said selector circuit to be actuated in response to said preselected fraction of said calibrating impulse, and said modulating means including means to selectively move it into and out of said path of said beam.

7. In an inspection system of the type used for detecting the presence of a moving foreign particle of borderline size or greater in the fluid of a translucent container and comprising (1) a source of a radiant energy beam, (2) a first beam directive means, (3) a second beam directive means behind said first beam directive means, (4) means responsive to the radiant energy through said second beam directive means for deriving an electrical signal therefrom, (5) means for amplifying said signal, (6) a selector circuit, and (7) means responsive to the amplified signal for actuating said selector circuit when said moving particle modulates said beam; the combination therewith of a means for modulating said beam disposed in the path of said beam for providing a calibrating impulse, an attenuating means variable by known amounts disposed between said electrical signal deriving means and said amplifying means to reduce the magnitude of said calibrating impulse to a preselected fraction thereof, means for adjusting the gain of said amplifying means to cause said selector circuit to be actuated in response to said preselected fraction of said calibrating impulse, and said attenuating means including means to selectively insert and remove said attenuating means between said electrical signal deriving means and said amplifying means.

References Cited in the file of this patent

UNITED STATES PATENTS

| | | |
|---|---|---|
| 1,565,596 | Snook | Dec. 15, 1925 |
| 1,773,119 | Reynolds | Aug. 19, 1930 |
| 1,871,404 | Brown | Aug. 9, 1932 |
| 2,188,097 | Thompson | Jan. 23, 1940 |
| 2,202,060 | Mitchell | May 28, 1940 |
| 2,234,011 | Shepard | Mar. 4, 1941 |
| 2,290,606 | Burnett | July 21, 1942 |
| 2,312,953 | Barney | Mar. 2, 1943 |
| 2,531,529 | Price | Nov. 28, 1950 |